United States Patent
Boyd et al.

(10) Patent No.: US 9,186,851 B2
(45) Date of Patent: Nov. 17, 2015

(54) PROCESSING OF POLYMER MATRIX COMPOSITES

(75) Inventors: Jack Douglas Boyd, Silverado, CA (US); Spencer Donald Jacobs, San Ramon, CA (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/582,963

(22) Filed: Oct. 21, 2009

(65) Prior Publication Data

US 2010/0098927 A1    Apr. 22, 2010

Related U.S. Application Data

(60) Provisional application No. 61/107,462, filed on Oct. 22, 2008.

(51) Int. Cl.
  *B29C 70/44* (2006.01)
  *B29C 70/30* (2006.01)
  *C08J 5/24* (2006.01)
  *B29C 71/00* (2006.01)
  (Continued)

(52) U.S. Cl.
  CPC ........... *B29C 70/44* (2013.01); *B29C 70/30* (2013.01); *C08J 5/24* (2013.01); *B29C 71/00* (2013.01); *B29C 2035/0283* (2013.01); *B29C 2071/0036* (2013.01); *B29K 2063/00* (2013.01); *B29K 2079/08* (2013.01); *B29K 2105/246* (2013.01)

(58) Field of Classification Search
  CPC ............................... B29C 70/44; B29C 70/30
  USPC ............ 264/257, 85, 82, 101, 234, 345, 571; 425/73
  See application file for complete search history.

(56) References Cited

U.S. PATENT DOCUMENTS

| 4,894,413 A | 1/1990 | Catsiff et al. |
| 4,999,395 A | 3/1991 | Croman et al. |

(Continued)

FOREIGN PATENT DOCUMENTS

| CN | 1990540 A | 7/2007 |
| EP | 0957129 A | 11/1999 |

(Continued)

OTHER PUBLICATIONS

ISR/Written Opinion for PCT/US2009/061242 mailed on Jan. 28, 2010.

*Primary Examiner* — Matthew Daniels
(74) *Attorney, Agent, or Firm* — Thi D. Dang

(57) ABSTRACT

Systems and methods for the reduction of volatile component content from shaped prepregs and prepreg layups and the layups and composites formed therefrom are disclosed. One or more shaped prepregs or prepreg layups are placed within an enclosure and a flow of a non-condensing gas is introduced adjacent at least one surface of the shaped prepregs or prepreg layups, accelerating the rate and/or the completeness of removal of volatile components from the shaped prepregs or prepreg layups. The shaped prepregs or prepreg layups may be further subjected to heat, vacuum, and external pressure to facilitate removal of the volatile components. Shaped prepregs and prepreg layups with volatiles reduced in this manner may be further consolidated with heat, external pressure and/or vacuum. Beneficially, reduced matrix bleed and reduced fiber movement may be achieved during processing, reducing manufacturing time and improving part quality.

19 Claims, 6 Drawing Sheets

(51) Int. Cl.
*B29C 35/02* (2006.01)
*B29K 63/00* (2006.01)
*B29K 79/00* (2006.01)
*B29K 105/24* (2006.01)

(56) References Cited

U.S. PATENT DOCUMENTS

| | | | | |
|---|---|---|---|---|
| 5,086,149 | A | * | 2/1992 | Baron et al. .................. 528/45 |
| 5,171,693 | A | * | 12/1992 | Johnson et al. ................ 436/85 |
| 5,242,651 | A | * | 9/1993 | Brayden et al. ............... 264/510 |
| 5,707,471 | A | * | 1/1998 | Petrak et al. ............... 156/89.27 |
| 6,036,900 | A | * | 3/2000 | Munk et al. ................... 264/102 |
| 6,391,959 | B1 | * | 5/2002 | Ninomiya et al. ............ 524/495 |
| 6,861,017 | B1 | * | 3/2005 | McCarville et al. ............ 264/39 |
| 7,100,656 | B2 | * | 9/2006 | Lamb et al. ................... 156/381 |
| 7,185,421 | B1 | * | 3/2007 | Ohmi et al. .................... 29/830 |
| 8,647,548 | B1 | * | 2/2014 | Humfeld ....................... 264/137 |
| 2003/0176625 | A1 | | 9/2003 | Morhenn et al. |
| 2007/0265417 | A1 | * | 11/2007 | Ronk et al. .................... 528/170 |

FOREIGN PATENT DOCUMENTS

| | | |
|---|---|---|
| GB | 1396331 A | 6/1975 |
| JP | 04-269897 A | 9/1992 |
| JP | 05-162128 A | 6/1993 |
| JP | 05-162129 A | 6/1993 |
| JP | 2011-533261 | 10/1999 |
| WO | 9100884 A | 1/1991 |
| WO | 2004-048470 A1 | 6/2004 |

* cited by examiner

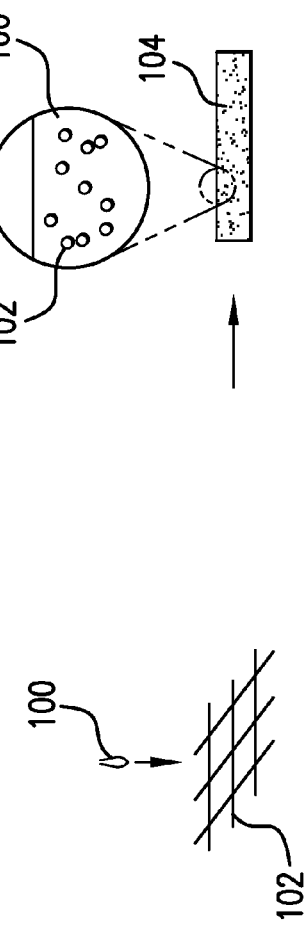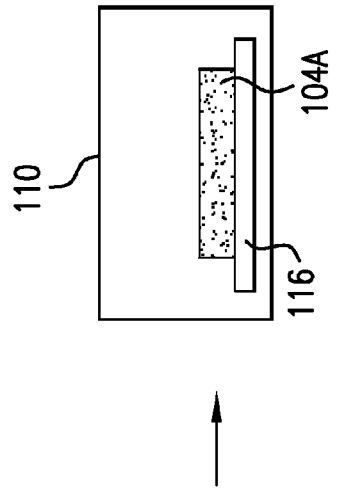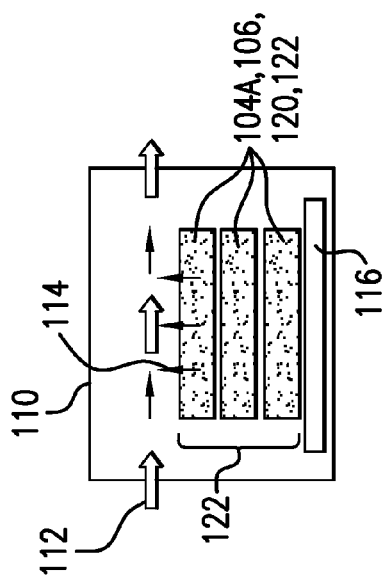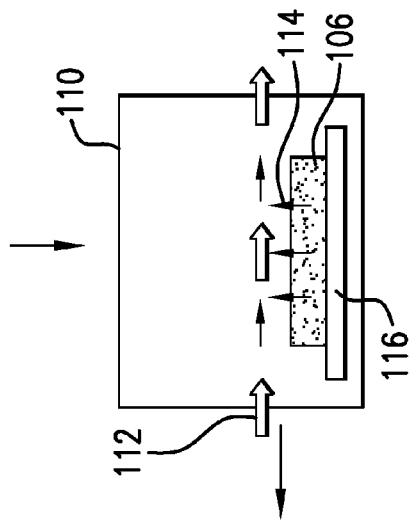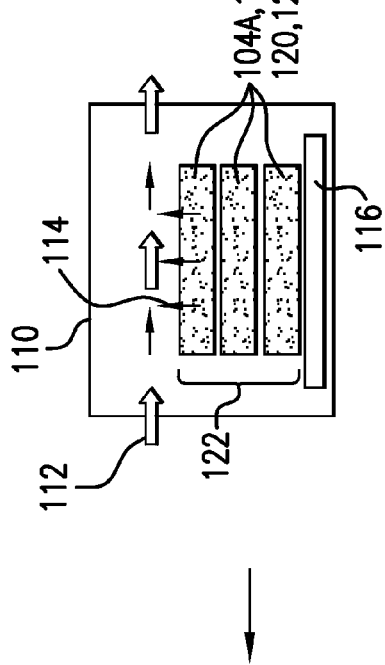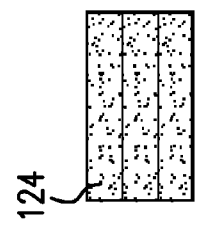

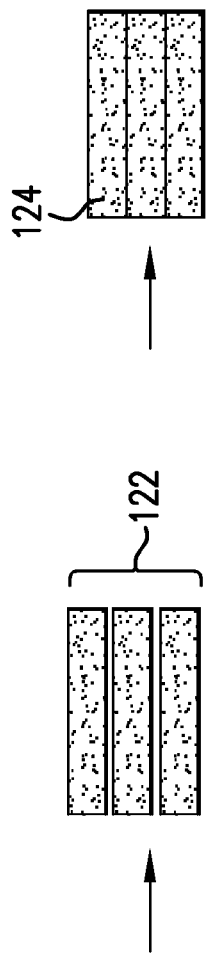
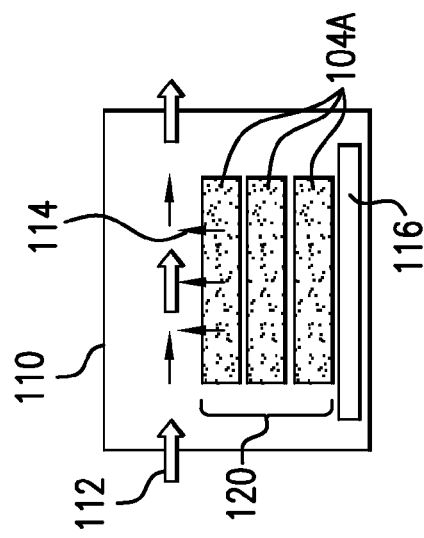

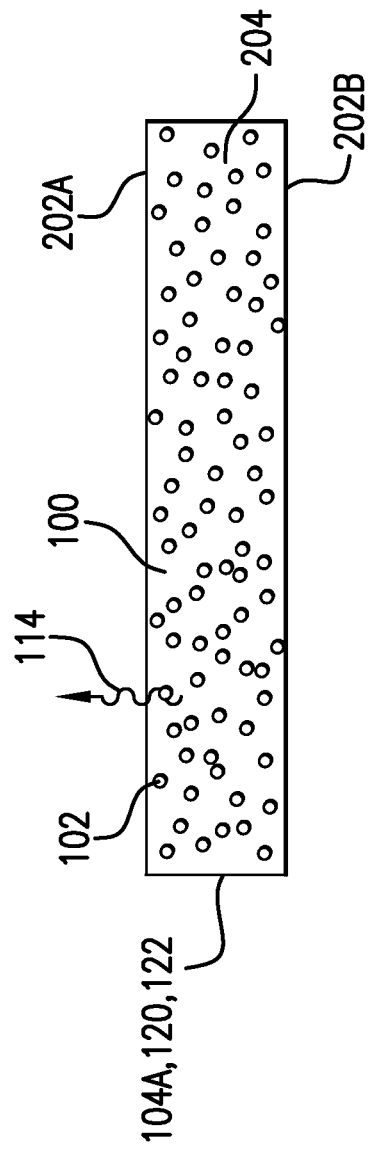
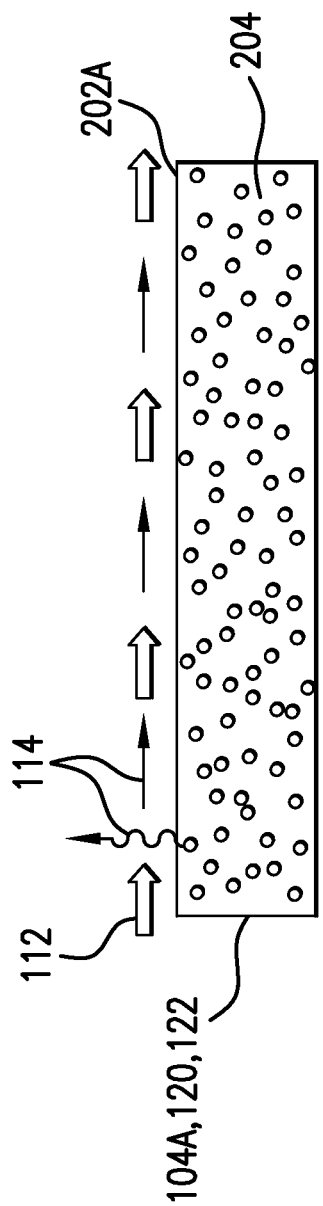

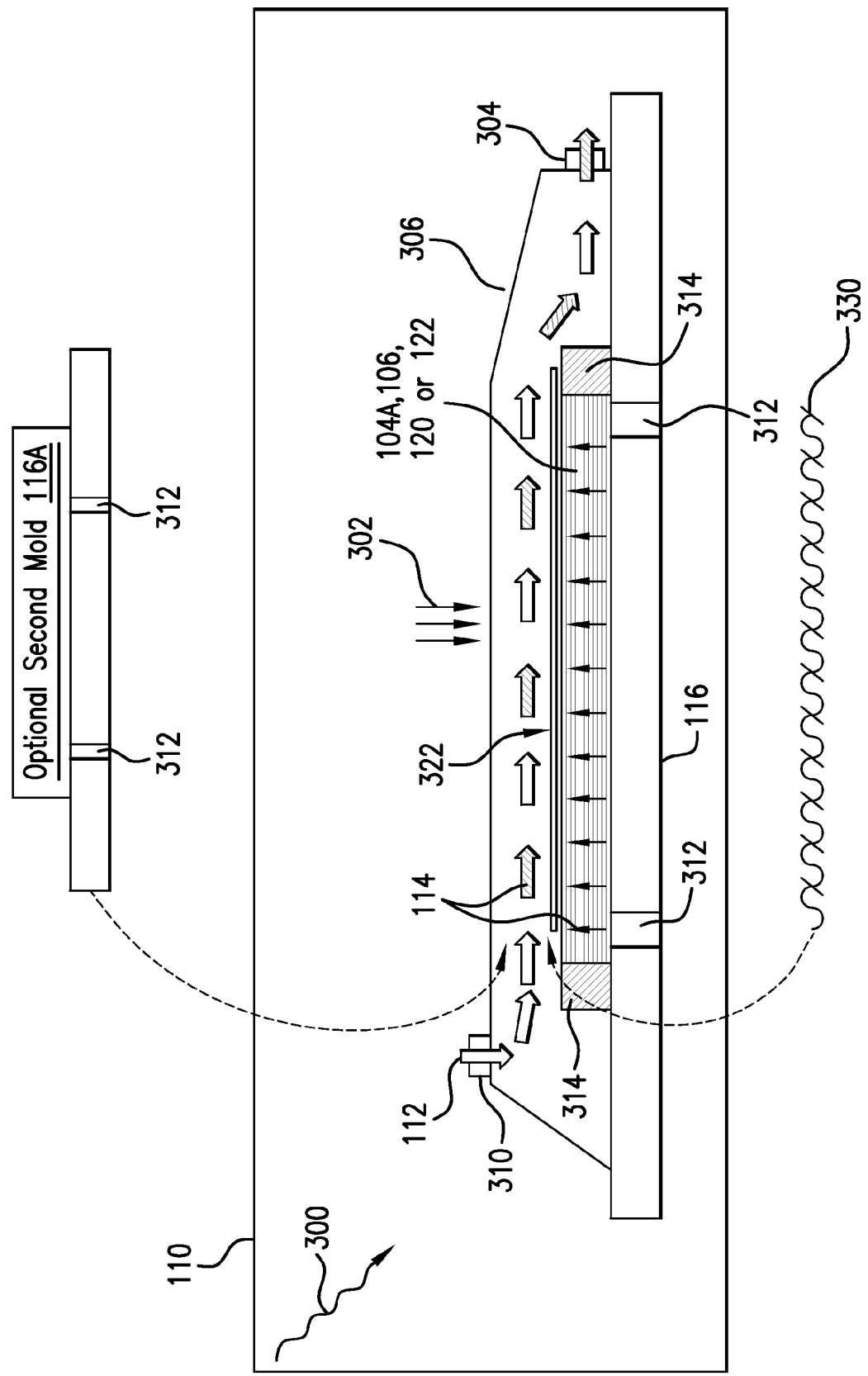

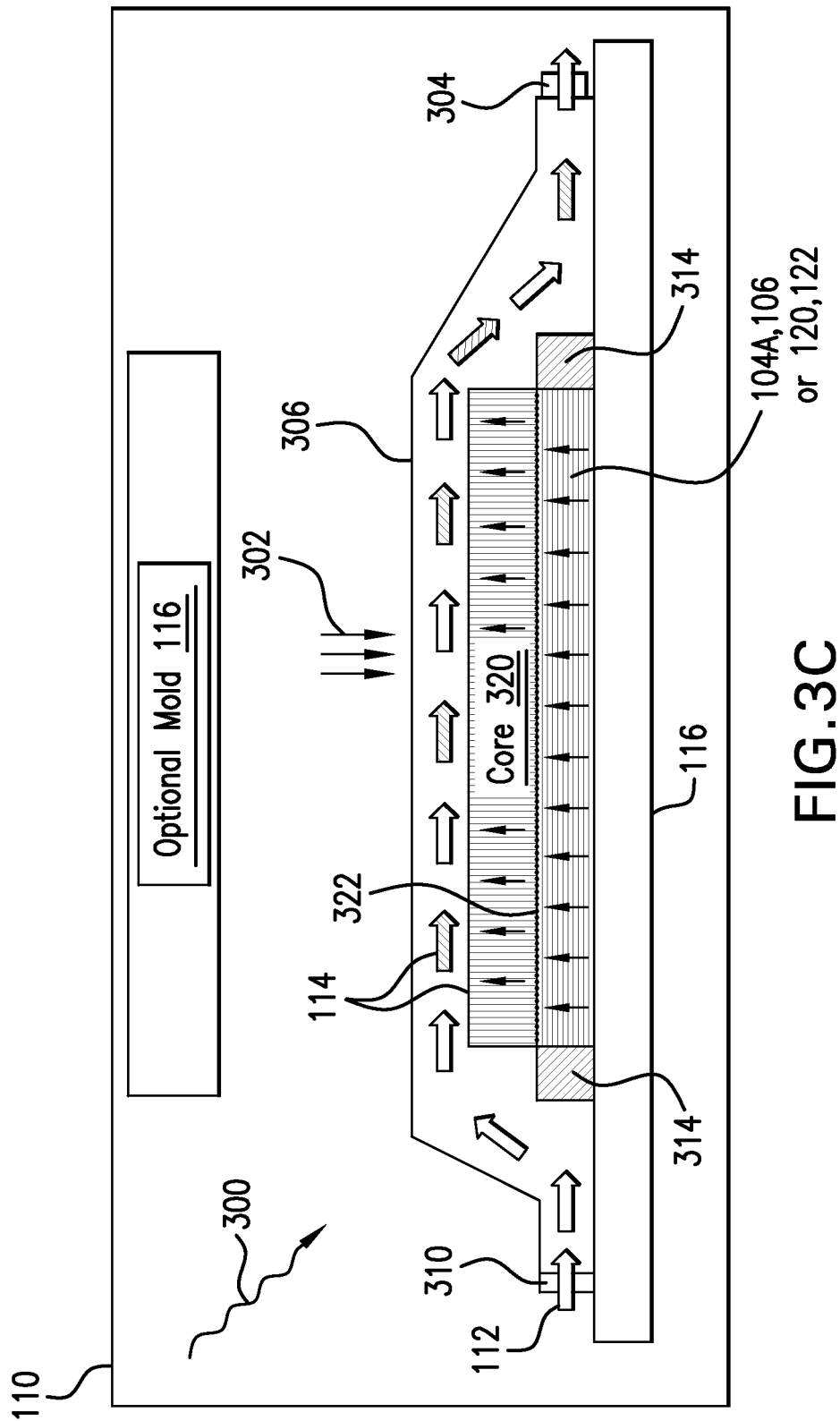

PROCESSING OF POLYMER MATRIX COMPOSITES

This application claims the benefit of U.S. Provisional Patent Application No. 61/107,462, filed Oct. 22, 2008, the disclosure of which is incorporated by reference in its entirety.

BACKGROUND

Embodiments of the present disclosure relate to polymer matrix composites and, in particular, to systems and methods for the removal of volatile components from prepregs and prepreg layups and composites formed therefrom.

DESCRIPTION OF THE RELATED ART

Fiber-reinforced polymer matrix composites (PMCs) are high-performance structural materials that are commonly used in applications requiring high strength and/or low weight. Examples of such applications include aircraft components (e.g. tails, wings, fuselages, propellers), boat hulls, and bicycle frames. PMCs comprise layers of fibers that are bonded together with a matrix material, such as a polymer resin. The fibers reinforce the matrix, bearing the majority of the load supported by the composite, while the matrix bears a minority portion of the load supported by the composite and also transfers load from broken fibers to intact fibers. In this manner, PMCs may support greater loads than either the matrix or fiber may support alone.

PMCs may be assembled from one or more layers of pre-impregnated fibers, or prepregs, where the matrix material is combined with the fiber material prior to fabrication of the PMC. The prepregs are assembled in a layup, an assembly of one or more prepreg layers having the prepreg fibers oriented in a selected configuration. The layup may be further subjected to heat, vacuum and pressure to consolidate and shape the layup into the desired composite part. In order to facilitate manufacture of prepregs, the matrix material may be dissolved within a solvent. With some matrix materials, for example polyimide resins, the solvent facilitates the molding process by providing the prepregs with sufficient pliability to adopt the shape of the mold and/or with tack.

A challenge of composite processing is the achievement of low porosity composites. Porosity is detrimental to PMCs, as it may weaken the mechanical properties of the matrix, which in turn weakens the mechanical properties of the PMC. High porosity is a particularly a problem encountered in the fabrication of PMCs from prepregs having a high concentration of solvents. In one example, volatile components, such as volatile organic compounds (VOCs), N-methylpyrrolidone (NMP), and water, may be present within the matrix as solvents or may be generated within the matrix by chemical reaction. Volatile components with relatively low boiling points may continuously enter the gas phase and become trapped during processing of the prepregs, while volatile components with relatively high boiling points may remain in the liquid phase longer during composite processing and also become trapped within the composite as porosity.

The removal of volatile components from PMC prepregs and prepreg layups is a significant problem encountered in the manufacture of PMCs from prepregs and layups, however. For example, while solvents may be removed by raising the temperature of the prepreg or prepreg layup to a temperature where the solvents within the prepreg or layup boils under vacuum, the boiling processes may result in significant resin loss, or bleed, from the prepregs and layups. This bleed is problematic because it is necessary to compensate for this resin loss by the addition of more resin to prepreg or layup, increasing the cost of manufacturing the PMC. In another aspect, significant boiling may cause distortion or wrinkling of the fibers from their intended orientation, potentially weakening the mechanical properties of the PMC so manufactured. Additionally, significant time or extra processing steps may be required to remove a desired amount of solvent, further increasing the cost of manufacturing the PMC.

SUMMARY

In an embodiment, a method of removing volatile components from a shaped prepreg to yield a reduced volatile prepreg is provided. The method comprises, introducing a flow of a non-condensing gas adjacent a shaped prepreg in an enclosure, where the gas transports one or more volatilized components that are evolved from the shaped prepreg away from the shaped prepreg. In certain embodiments of the method, at least a portion of the shaped prepreg is positioned either adjacent to or in contact with a mold while exposed to the flow of non-condensing gas In a further embodiment, a method of forming a reduced volatile prepreg layup is provided. The method comprises addition of one or more of the shaped prepregs to a lay-up to form a shaped prepreg layup and then reducing the volatiles according to the method of reducing volatile components from a shaped prepreg discussed above. In a further embodiment a method of forming a reduced volatile prepreg layup is provided where any combination of one or more shaped prepregs, reduced volatile prepregs, prepreg layups and/or reduced volatile prepreg layups are assembled and where one or more are a reduced volatile prepreg or a reduced volatile prepreg lay-up, volatiles are further reduced by the flow of non-condensing gas described above.

In another embodiment, a reduced volatile prepreg layup is provided. The reduced volatile prepreg layup comprises reduced volatile layups made according to the methods discussed above.

In an additional embodiment, a method of fabricating a fiber-reinforced composite is provided. The method comprises introducing a flow of a non-condensing gas adjacent at least one surface of a shaped prepreg or prepreg layup within an enclosure so as to remove at least a portion of volatile components that are emitted from the prepreg layup from a position adjacent the at least one surface. In a further embodiment a method of fabrication of fiber-reinforced composite is provided where any combination of one or more reduced volatile layups, shaped prepregs, prepreg layups and/or reduced volatile prepregs described above, where at least one is a reduced volatile prepreg or reduced volatile layup, are combined and consolidated and cured using one of vacuum, pressure and heat into a fiber-reinforced composite having a selected shape.

In another embodiment, a fiber-reinforced composite is provided. The composite comprises any combination of one or more shaped prepregs, reduced volatile prepregs, prepreg layups and/or reduced volatile prepreg layup where at least one is a reduced volatile prepreg or reduced volatile layup which are consolidated under application of at least one of heat, pressure, and vacuum to form a fiber-reinforced polymer composite having a porosity ranging between about 0 to 30 vol. %, on the basis of the total volume of the fiber-reinforced polymer composite.

In a further embodiment, a reduced volatile prepreg is provided. The reduced volatile prepreg comprises a reduced volatile prepreg formed according to the method of removing volatile components from a shaped prepreg discussed above.

In another embodiment, a method of facilitating adhesive bonding of components is provided. The method comprises introducing an adhesive within an interface between two or more components called an assembly. The method further comprises introducing a flow of a non-condensing gas adjacent to the interface or assembly where the gas transports one or more volatile components evolved from the adhesive away from the interface or assembly.

BRIEF DESCRIPTION OF THE DRAWINGS

FIGS. 1A-1J illustrate a schematic overview of one embodiment of a method of removing volatile components from prepregs and prepreg layups and composite parts formed therefrom;

FIGS. 2A-2B illustrate one embodiment of a possible mechanism for the reduction of volatile components from shaped prepregs and prepreg layups that employs a flow of a non-condensing gas adjacent the shaped prepreg and prepreg layups; and FIGS. 3A-3C illustrate embodiments of enclosures that may be employed for the removal of volatile components from prepregs and prepreg layups and the manufacture of composite parts from these prepregs and layups.

DETAILED DESCRIPTION

Figure 3B:
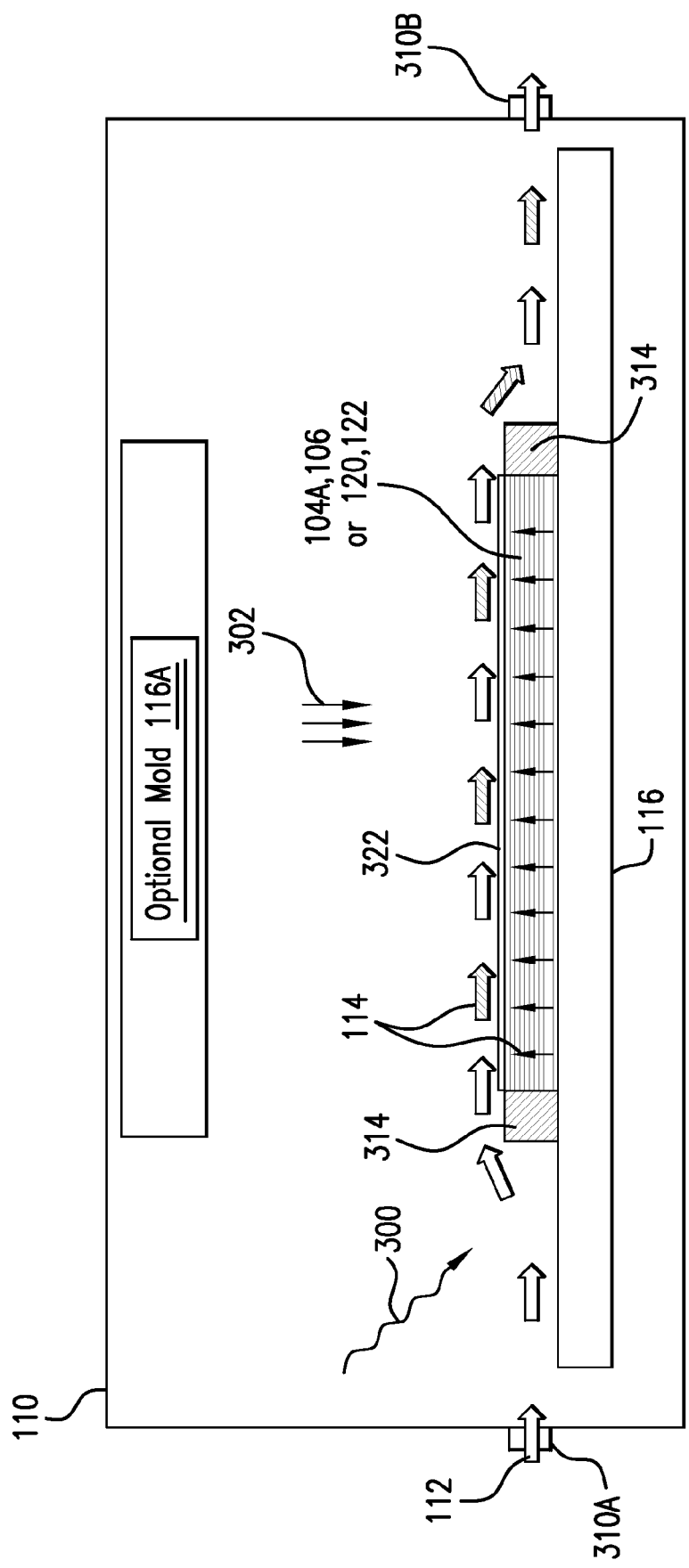

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The phrase "at least a portion of" as used herein represents an amount of a whole amount that may range from less than the whole amount to up to and including the whole amount. For example, the term "at least a portion of" may refer to an amount that is greater than 0.01% of, greater than 0.1% of, greater than 1% of, greater than 10% of, greater than 20% of, greater than 30% of, greater than 40% of, greater than 50% of, greater than 60% of, greater than 70% of, greater than 80% of, greater than 90% of, greater than 95% of, greater than 99% of, and 100% of the whole. The term weight % or wt. % as used herein has its ordinary meaning as known to those skilled in the art.

The term "room temperature" as used herein has its ordinary meaning as known to those skilled in the art and may include temperatures within the range of about 16° C. (60° F.) to 38° C. (100° F.).

The term "fiber" as used herein has its ordinary meaning as known to those skilled in the art and may include one or more fibrous materials adapted for the reinforcement of composites. Fibers may take the form of particles, flakes, whiskers, short fibers, continuous fibers, filaments, tows, bundles, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, and less than about 125000 filaments. In further embodiments, the tows may be held in position by cross-tow stitches, weft-insertion knitting stitches, or a small amount of resin, such as a thermoplastic resin.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, polyamide, and graphite, silicon carbide, silicon nitride, Astroquartz®, Tyranno®, Nextel®, and Nicalon®, and combinations thereof.

The terms "matrix", "resin", and "matrix resin" as used herein have their ordinary meaning as known to those skilled in the art and may include one or more compounds comprising thermoset and/or thermoplastic materials. Examples may include, but are not limited to, epoxies, epoxy curing agents, phenolics, phenols, cyanates, polyimides (e.g., imides, polyimides, bismaleimide (BMI), polyetherimides), polyesters, benzoxazines, polybenzoxazines, polybenzoxazones, polybenzimidazoles, polybenzothiazoles, amides, polyamides, esters, polyesters, polyamidimides, polysulphones, polyether sulphones, polycarbonates, polyethylene terepthalates, cyanates, and polyether ketones (e.g. polyether ketone (PEK), polyether ether ketone (PEEK), polyether ketone ketone (PEKK) and the like), combinations thereof, and precursors thereof.

The processing of some of these resins, for example, polyamid and polyimide resins, may be improved by use of reactive or unreactive endcaps. Examples of endcaps may include, but are not limited to, nadic and substituted nadic compounds such as nadic imide and allylnadicimide. ethynyl compounds and substituted ethynyl compounds, such as phenylethynyl and phthalic phenylethynyl compounds and olefuric compounds.

Matrices, as discussed herein, may further comprise additives. Such additives may be provided to influence one or more of mechanical, rheological, electrical, optical, chemical, and/or thermal properties of the matrix. Such additives may further comprise materials that chemically react with the matrix or are unreactive with the matrix. The additives may be any combination of soluble, insoluble or partially soluble. The size distribution and geometry of such additives may also be varied, as necessary. For example, the size of the additives may range between nanoscale dimensions (approximately 1 nm-100 nm), microscale dimensions (approximately 100 nm-100 μm), and macroscale dimensions, greater than about 100 μm. In other examples, the additives may be configured in geometries including, but not limited to, particles, flakes, rods, fibers and the like. In additional examples, the additives may be distributed within a selected area of the matrix (e.g. adjacent a surface of the matrix or at the ply interfaces) or evenly distributed or dissolved within the matrix. Examples of additives may include, but are not limited to, organic and inorganic substances such as thermoplastics, rubbers, nanorubbers, thermosets, flame retardants, ultraviolet (UV) protectors, thickeners (e.g., Cabosil®), and reinforcements to enhance one or more of strength, viscosity, damage tolerance, toughness, crack resistance wear resistance (e.g., rubbers, ceramics, and/or glasses).

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within the prepreg may be formulated and/or partially cured in order to exhibit a selected stickiness or tack. In certain embodiments, consolidation and curing may be performed in a single process.

The term "consolidation" as used herein has its ordinary meaning as known to those skilled in the art and may include processes in which the resin or matrix material flows so as to displace void space within and adjacent fibers. For example, "consolidation" may include, but is not limited to, flow of matrix into void spaces between and within fibers and prepregs, and the like. "Consolidation" may further take place under the action of one or more of heat, vacuum, and applied pressure.

The term "impregnate" as used herein has its ordinary meaning as known to those skilled in the art and may include the introduction of a matrix material between or adjacent to one or more fibers. The matrix may take the form of films, powders, liquids, and combinations thereof. Impregnation may be facilitated by the application of one or more of heat, pressure, and solvents.

The term "prepreg" as used herein has its ordinary meaning as known to those skilled in the art and may include one or more sheets of fibers that have been fully or partially impregnated with a matrix material. The matrix may also be present in a partially cured state.

The term "shaped prepreg" as used herein has its ordinary meaning as known to those skilled in the art and may include prepregs that possess a selected geometric configuration. The selected geometric configuration may comprise planar geometries, curvature in one or more dimensions, and combinations thereof. In one embodiment, a prepreg may be shaped by impregnation of a fiber preform having the selected geometric configuration. In other embodiments, the prepreg may be deformed from a first geometric configuration to a second selected geometric configuration. In certain embodiments, the prepreg may possess sufficient integrity such that the shaped prepreg may maintain the selected geometric configuration after deformation without constraint. In other embodiments, the prepreg may be deformed and constrained in place by one or more molds or other shaping devices. In one non-limiting embodiment, a shaped prepreg may comprise a prepreg that possesses sufficient drape so as to conform to at least a portion of a mold or other shaping device so as to adopt the selected geometric configuration.

The term reduced volatile prepreg as used herein include shaped prepregs that have been exposed to a flow of non-condensing gas so as to remove a selected amount of volatile components from a shaped prepreg. In certain embodiments, reduced volatile prepregs may possess a concentration of volatile components less than about 30 weight. %. In other embodiments, the reduced volatile prepreg may be less than about 10 wt. %.

The terms "prepreg layup" and "shaped prepreg layup" as used herein have their ordinary meaning as known to those skilled in the art and may include a plurality of prepregs that are placed adjacent one another. In certain embodiments, the prepregs within the layup may be positioned in a selected orientation with respect to one another. For example, prepreg layups may comprise prepregs having unidirectional fiber architectures, with the fibers oriented at 0°, 90°, or a selected angle θ, and combinations thereof, with respect to a dimension of the layup, such as the length or width. It may be further understood that, in certain embodiments, prepregs having any combination of architectures, such as unidirectional and multi-dimensional, may be combined to form the prepreg layup. A prepreg layup may be shaped by being placed on, in or adjacent to a mold or other constraining device. Further embodiments of a prepreg layup may include a plurality of shaped prepregs that are similarly placed adjacent one another.

In a further embodiment, a prepreg layup may be stitched together with a threading material in order to inhibit the prepregs relative motion from a selected orientation. Prepreg layups may be manufactured by techniques including, but not limited to, hand layup, automated tape layup (ATL), advanced fiber placement (AFP), and filament winding, resin film infusion (RFI) or resin transfer molding (RTM). The prepreg layup or reduced volatile prepreg layup may further include other materials, non-limiting examples are honeycomb, foam core, or other materials, for example, metal stiffeners.

The terms "reduced volatile layup" and "reduced volatile prepreg layup" as used herein include shaped prepreg layups that have been exposed to a flow of non-condensing gas in an enclosure so as to remove a selected amount of volatile components from a shaped prepreg layup. In certain embodiments, reduced volatile prepreg layups may possess a concentration of volatile components less than about 30 wt. %. Further embodiments of reduced volatile prepreg layups may include a prepreg layup comprising a plurality of reduced volatile prepregs. In another embodiment, reduced volatile prepreg layup can be any combination of shaped prepregs, reduced volatile prepregs, layups, and/or reduced volatile layups where at least one has had the volatile components reduced by a flow of non-condensing gas described above. In another embodiment the reduced volatile prepreg layups after assembly can have the volatile components reduced further by the flow of non-condensing gas.

The terms "volatile component" and "volatiles" as used herein have their ordinary meaning as known to those skilled in the art and may include compounds that have a vapor pressure such that at least a portion of the volatile component may vaporize at temperatures up to about 300° C. Examples may include, but are not limited to gases dissolved within the matrix resin (e.g., air, nitrogen, oxygen, water), solvents including but not limited to alcohols, chlorated solvents, hydrocarbons, dimethylacetamide and N-methylpyrrolidone (NMP), and compounds produced by reaction such as, alcohols, organic acids, inorganic acids, water, and other volatile species Embodiments of the present disclosure provide methods for the removal of volatile components from shaped prepregs, prepreg layups and/or reduced volatile prepreg layups. Further embodiments of the present disclosure provide composites formed from reduced volatile prepregs and reduced volatile prepreg layups. In one embodiment, one or more shaped prepregs, prepreg layups and/or reduced volatile layups are placed within an enclosure and a non-condensing gas is introduced into and removed from the enclosure simultaneously or sequentially, adjacent at least one surface of the shaped prepreg, prepreg layup and/or reduced volatile layup. Optionally, one of heat, pressure and/or vacuum may be applied to facilitate volatile removal. Examples of suitable non-condensing gases may include, but are not limited to air, nitrogen, oxygen, neon, argon, methane, ethane, ethylene, propane, hydrogen, helium, and combinations thereof. The flow of the non-condensing gas assists in the removal of volatile components, such as solvents, from the shaped prepreg, prepreg layups or reduced volatile prepreg layups by at least increasing the rate and/or the completeness at which volatile components are removed. In certain embodiments, shaped prepregs, prepreg layups or reduced volatile layups may be subjected to heat, pressure, vacuum, and combinations thereof, to further assist the evolution and removal of the volatile components. Combinations of shaped prepregs, reduced volatile prepreg layups, reduced volatile prepregs, and prepreg layups where at least one is reduced volatile as described may be further subjected to heat, with pressure and/or vacuum, to form composite structures.

In certain embodiments, the loss of matrix resin from the shaped prepreg or prepreg layups, e.g., bleed, that occurs when removing volatile components may be reduced using a flow of non-condensing gas. Ancillary effects associated with excessive bleed, such as blockage of matrix passageways and gas flow, may also be ameliorated by use of a flow of non-condensing gas to remove volatile components from shaped prepregs, prepreg layups and reduced volatile prepreg layups. For example, in certain embodiments, about 0 to 30 wt. % of the matrix solids, on the basis of the total weight of matrix solids prior to removal of the volatile components, may bleed when fabricating reduced volatile prepregs or reduced volatile prepreg layups according to the disclosed embodiments. As discussed, the flow of non-condensing gas may increase the rate or the completeness of removal of volatile components, such as solvents, from the shaped prepregs prepreg layups or reduced volatile prepreg layups. Without being bound to a particular theory, removal of volatiles, in turn, may cause the matrix viscosity to increase at a faster rate than would be achieved absent the flow of non-condensing gas, inhibiting the flow of the matrix from the shaped prepregs, prepreg layups or reduced volatile prepreg layups. In a further embodiment removal of the volatile components may cause the matrix resin components to form crystals which may further inhibit bleed and may promote ply to ply volatile transport. Beneficially, by maintaining a greater portion of the starting volume of matrix within the shaped prepregs, prepreg layups or reduced volatile prepreg layups a reduced volume of excess matrix is required to compensate for bleed, reducing the cost to manufacture composite components.

In other embodiments, the use of a flow of non condensing gas to remove volatile components from shaped prepregs, prepreg layups or reduced volatile layups may inhibit the development of misaligned fibers in the composite part. When prepregs or shaped prepregs are stacked in a prepreg layup, the fibers are generally aligned in selected orientations for strength. Without being bound by theory, it is believed that, when matrix components are volatilized and evolve from the shaped prepreg, prepreg layup or reduced volatile layup, an excess of volatilized components may develop within shaped prepreg, prepreg layup or reduced volatile layup if their evolution rate is greater than their removal rate from the shaped prepreg, prepreg layup or reduced volatile layup, exerting a pressure that displaces the fibers. Fibers that are displaced may further wrinkle, as they tend not to lie flat after being displaced. Both fiber displacement and wrinkling may move the fibers from their intended orientation and may weaken the composite strength. By removing volatile components at a sufficient rate from the shaped prepreg or prepreg layup, the amount of excess gas that builds up within the shaped prepreg, prepreg layup or reduced volatile layup. during volatile reduction, consolidation, and/or cure may be greatly reduced, reducing the likelihood of fiber displacement during consolidation and cure.

In one embodiment, fiber displacement may be quantified by an angle at which a unidirectional fiber or a continuous fiber of a woven fiber structure is positioned with respect to a selected direction. For example, a properly aligned fiber would demonstrate an angle of about 0° with respect to a selected direction. In certain embodiments, fiber displacement may be characterized by microscopy.

In additional embodiments, the use of a flow of non-condensing gas to remove volatile components from a shaped prepreg, prepreg layup or reduced volatile layup may simplify the fabrication process. For example, a shaped prepreg, prepreg layup or reduced volatile layup may be subjected to a flow of a non-condensing gas in combination with heat pressure and/or vacuum so as to urge volatile components within the matrices of the shaped prepreg, reduced volatile prepreg layup or prepreg layup to enter the gas phase, evolve from the shaped prepreg, reduced volatile prepreg or prepreg layup, and be transported away from the shaped prepreg or and prepreg layup. Advantageously, one such operation may remove a comparable amount of volatile content as may be achieved by application of heat and pressure alone but at a faster rate or to a higher completeness.

In further embodiments, the use of a flow of non-condensing gas to remove volatile components from a shaped prepreg or prepreg layup may enable the fabrication of larger, more complex composites than has been traditionally possible. As the size of a composite part is increased, the volume of matrix material within a shaped prepreg, prepreg layup or reduced volatile layup used to form the composite part is also increased, resulting in greater matrix bleed from the shaped prepreg, prepreg layup or reduced volatile layup, as compared with smaller composite parts. Furthermore, significantly more time is necessary to remove volatile components from prepreg layups for large composite parts, as compared with smaller composite parts. By introducing a flow of non-condensing gas through the enclosure containing a shaped prepreg, prepreg layup or reduced volatile layup, the amount of matrix bleed exhibited by the shaped prepreg, prepreg layup or reduced volatile layup, and/or the time necessary to remove volatile components from the shaped prepreg, prepreg layup or reduced volatile layup may be reduced, facilitating the fabrication of large composite parts and reducing porosity and/or bleed. These and other advantages of the disclosed embodiments are discussed in detail below.

FIGS. 1A-1I illustrate a embodiments of a method of manufacturing reduced volatile prepregs, reduced volatile prepreg layups, and composites formed using these reduced volatile prepregs and reduced volatile prepreg layups. Depending on the embodiment, the method of FIGS. 1A-1I may include fewer or additional steps and the steps may be performed in a different order, as necessary, without departing from the scope of the disclosed embodiments.

In one embodiment, FIGS. 1A-1B, prepregs 104 may be manufactured by impregnation of a matrix 100, in the form of solids, semi-solid films, powders, and liquids, into fibers 102, with or without application of heat pressure and/or vacuum. The impregnation may be performed using a number of techniques including, but not limited to, solution processes, such as solution dip and solution spray, melt and working processes, such as direct melt and film calendaring, and resin transfer (RTM), vacuum-assisted resin transfer (VARTM) or resin film infusion (RFI). These processes are designed to bring at least a portion of the fibers 102 into contact with the matrix 100 in a flowable or malleable state and impregnate the fibers 102 with the matrix 100. To facilitate the layup process, the tack of the prepreg may be adjusted accordingly during and/or after matrix impregnation by the solvent content of the matrix resin.

In solution dip processes, the fibers 102 may be passed through a bath of matrix solids that are dissolved within a solvent. As the fibers 102 pass through the bath, they pick up an amount of matrix solids that varies with factors such as the speed at which the fibers 102 are passed through the bath and the concentration of matrix solids within the bath. In solution spray processes, a selected amount of matrix solids are sprayed upon the fiber 102. In each case of solution processing, the impregnated fiber 102 may be heated after exposure to the bath or spray in order to substantially adjust the solvent content and adjust, for example, handling of the prepreg.

In direct melt processes, the matrix 100 is provided as a coating directly upon the fiber 102 at an elevated temperature. At the temperature of application, the matrix 100 is sufficiently flowable so as to impregnate at least a portion of the fibers 102. Alternatively, in film calendaring, the matrix 100 is cast into a film from melt or solution. The fiber 102 is subsequently sandwiched between one or more matrix films and calendared so as to work the matrix film into the fiber 102. In each case, the impregnated fiber 102 may be heated and/or solvent may be added in order to substantially adjust the solvent content and adjust, for example, the flexibility of the prepreg.

In RTM and VARTM, the matrix 100 is injected into a mold or mold that contains the fibers 102. The fibers 102 are provided as a dry fiber preform or a pre-impregnated preform with less than the desired amount of matrix 100. The matrix 100 is then introduced into the mold with or without a carrier solvent. Under the influence of gravity, pressure, and capillary action (RTM) or gravity, capillary action, and vacuum (VARTM), the matrix 100 enters the fibers 102. In RFI, a film is used to provide the resin and typically placed adjacent to the fibers such as in a mold or vacuum bag.

The fiber content of the prepreg 104 may be varied, as dictated by the application. In one embodiment, the weight fraction of fiber 102 may range between about 20 to 80 wt. %, on the basis of the total weight of the prepreg 104.

The content and composition of the matrix 100 within the prepreg 104 may also be varied, as necessary. In one embodiment, the matrix solids within the prepreg 104 may range between approximately 20 to 80 wt. %, based upon the total weight of the prepreg 104. In one embodiment multiple solvents may be advantageous. A non-limiting example is a mixture of methanol and propanol where the different boiling points provide a more controllable evolution of volatile species making the shaped prepreg, prepreg layup and/or reduced volatile layup less susceptible to ply and fiber movement. Another non-limiting example is a mixture of 3 or 4 solvents.

The matrix 100 may further comprise one or more carrier solvents that reduce the viscosity of the matrix 100, facilitating impregnation and handling of the prepreg. Examples may include, but are not limited to, alcohols, chlorinated solvents, hydrocarbons N-methylpyrrolidone (NMP) and dimethylacetamide. In certain embodiments, the solvent is present within the prepreg 104 in a concentration of about 1 to 60 weight % on the basis of the total weight of the prepreg 104.

Prepregs so formed are further shaped prior to solvent reduction. In one embodiment, a prepreg 104 may be shaped by impregnation of a fiber preform having a selected geometric configuration. The selected geometric configuration may comprise planar geometries, curvature in one or more dimensions, and combinations thereof. In other embodiments, the prepreg 104 may be deformed from a first geometry to a second, selected geometry. In certain embodiments, the prepreg 104 may possess sufficient integrity such that the prepreg may maintain the selected geometric configuration after deformation without constraint. In other embodiments, the prepreg 104 may be constrained in place by a mold 116 or other shaping device. The mold 116 may further comprise texture and/or other surface and through thickness features, as necessary. In one non-limiting embodiment, a shaped prepreg may comprise prepregs that possess sufficient drape so as to conform to at least a portion of a mold or other shaping device so as to adopt the selected configuration.

As illustrated in FIG. 1D, shaped prepreg 104A may be placed within an enclosure 110 for example, a vacuum bag, or oven or press and exposed to a flow of non-condensing gas 112 for the removal of at least a portion of their volatile components 114 to form a reduced volatile prepreg 106. For example, in one embodiment, prepreg 104 may be shaped by placement of at least a portion of prepregs 104 adjacent to, or in contact with, mold 116 while exposed to a flow of non-condensing gas 112.

In certain embodiments, shaped prepregs 104A are added to an enclosure 110 for volatile reduction as in FIG. 1D. In alternative embodiments, shaped prepreg 104A may be prepared within the enclosure 110. For example, a dry shaped fiber preform may be introduced into the enclosure 110 and impregnated with the matrix 100 to form shaped prepreg 104A. In still other embodiments, shaped prepreg 104A may contain less than a selected amount of matrix 100 and may be further impregnated with additional matrix 100 within mold 116 to form shaped prepreg 104A.

The flow of non-condensing gas 112 may be injected and removed from the enclosure 110 in order to reduce the volatile components 114 content from shaped prepreg 104A and yield reduced volatile prepreg 106 as in FIG. 1D. In one embodiment the non-condensing gas 112 may be introduced into and removed from the enclosure 110 containing shaped prepreg 104A, at a selected rate for a selected of time period, in order to yield reduced volatile prepreg 106 having a concentration of volatile components that is less than that of shaped prepreg 104A. In another embodiment, the non-condensing gas 112 may be allowed to flow adjacent to at least one surface of shaped prepreg 104A at a selected rate for a selected time, yielding reduced volatile prepreg 106 having a concentration of volatile components that is less than that of shaped prepreg 104A. The non-condensing gas 112 may comprise gaseous species including, but not limited to, air, oxygen, nitrogen, neon, argon, methane, ethane, ethylene, propane, hydrogen, helium, and combinations thereof.

Non-condensing gas 112 may be introduced and removed from enclosure 110 in a variety of ways. In one embodiment, non-condensing gas 112 may be introduced and removed from enclosure 110 continuously. In other embodiments, the non-condensing gas 112 may be added and removed from the enclosure 110 in stepwise fashion, rather than in a continuous flow. The inlet and outlet for addition and removal of the non-condensing gas 112 from the enclosure 110 may be the same or different, as necessary.

Reduced volatile prepreg 106 so formed may be employed to form reduced volatile prepreg layups 122. In one embodiment, one or more reduced volatile prepregs 106 may be stacked to form the reduced volatile prepreg layup 122 (FIG. 1E). In a further embodiment, the reduced volatile prepreg layup 122 may comprise one or more reduced volatile prepregs 106 and/or reduced volatile prepreg layup 122 and/or shaped prepregs 104A and/or prepreg layups 120 (FIG. 1E). In a further embodiment, reduced volatile prepreg layup 122 may be comprised entirely of a plurality of reduced volatile prepregs 106. In the above embodiment in FIG. 1E, the volatile reduction operation is optional as long as at least one is a reduced volatile prepreg 106 or reduced volatile layup 122. In alternative embodiments, FIGS. 1H-1I, reduced volatile prepreg layups 122 are formed by performing the volatile reduction operations discussed above upon prepreg layups 120, rather than any combinations as discussed above. In such case, the volatile reduction process must be employed to produce reduced volatile prepreg layup 122.

In further embodiments, the volatile reduction process discussed above with respect to shaped prepreg 104A may be performed upon reduced volatile prepreg 106 or reduced volatile prepreg layup 122, alone or in combination with shaped prepreg 104A or prepreg layup 120, without limit. For example, reduced volatile prepreg 106 and reduced volatile prepreg layup 122 may be repeatedly subjected to volatile reduction by exposure to a flow of non-condensing gas 112 in order to obtain a selected volatile content.

The amount of volatile components removed from shaped prepreg 104A or shaped prepreg layup 120 or reduced volatile layup 122 in the volatile reduction process may be varied, as necessary. In one embodiment, the reduced volatile prepreg and reduced volatile prepreg layup 106, 122 may comprise about 0-99% of the volatile components contained within the shaped prepreg 104A, prepreg layups 120 or reduced volatile layups 122. That is to say, approximately 1-100% of the volatile content within the shaped prepreg 104A shaped prepreg layups 120 or reduced volatile prepreg layup 122 may be removed in formation of the reduced volatile prepregs 106 and reduced volatile prepreg layup 122. In other embodiments, the viscosity of the matrix in reduced volatile prepregs 106 and reduced volatile prepreg layups, 122, after removal of a selected amount of volatile components is higher than in the shaped prepreg 104A, prepreg layup 120 or reduced prepreg volatile layup 122 before volatile reduction. In other embodiments, some of the components of the reduced volatile prepregs 106 or reduced volatile layups 122 may crystallize which may promote, for example, ply to ply volatile movement.

In another embodiment, pores, holes or penetrations may be introduced into the prepregs 104, shaped prepregs 104A, prepreg layups 120 reduced volatile prepregs 106 and/or reduced layups 122 to promote ply to ply volatile movement larger than 0.1 mm or smaller than 20 mm.

Without being bound by theory, it is believed that, in certain embodiments, at least a portion of the volatile components within the matrix 100 evolve gases 114, such as volatilized solvents and/or other volatilized reaction products, that travel through the interior 204 of the shaped prepreg and shaped prepreg layup 104A, 120 to their exterior surfaces, such as exterior surfaces 202A, illustrated in FIG. 2A. The flow of non-condensing gas 112 adjacent at least one exterior surface of the shaped prepreg 104A or prepreg layup 120, or reduced volatile layup 122 such as exterior surface 202A, urges the evolved gases 114 away from the shaped prepreg, 104A, prepreg layup, 120 or reduced volatile layup 122 and out of the enclosure 110.

Reduced volatile prepregs and reduced volatile prepreg layups 106, 122 so formed may possess a selected amount of solvents and other volatiles that facilitate processing of the composite part 124. The solvent content of a shaped prepreg ranges between about 1 to 50 wt. %, for example, about 15 wt. %, based on the total weight of the shaped prepreg 104A. The solvent content of a reduced volatile prepreg 106 ranges between about 0 to 40 wt. %, for example, less than 10 wt. %, based upon the total weight of the reduced volatile prepreg 106. The viscosity of the matrix within shaped prepreg 104A, is also lower than the viscosity of the matrix within reduced volatile prepreg 106 or reduced volatile prepreg layup 122.

The flow rate of the non-condensing gas 112 may be varied, depending on parameters including, but not limited to, the size and geometry of the shaped prepreg or prepreg layup 104A, 120. In certain embodiments, the manner of non-condensing gas addition and removal can be varied. In one embodiment of continuous flow of the non-condensing gas 112, the flow rate may be greater than 0.001 ml/sec. In other embodiments, the flow rate may range between about 0.001 to 1000 ml/s.

FIGS. 3A-3C illustrate an embodiment of the enclosure 110 in greater detail. In certain embodiments, the enclosure 110 may be configured to provide heat 300, pressure 302, vacuum, and combinations thereof to the enclosure 110. In further embodiments, heat 300, pressure 302, and/or vacuum may be provided to the enclosure 110 before, during, and/or after introduction of the flow of non-condensing gas 112 in order to facilitate the removal of volatile components from a shaped prepreg 104A or prepreg layup 120. In other embodiments, the enclosure 110 may also be employed to provide any combination of heat 300, pressure 302, and vacuum in order to facilitate consolidation and curing of devolatilized prepreg 105 prepreg layups 122 into composite parts 124, as illustrated in FIGS. 1E-1F.

For example, as illustrated in the embodiment of FIG. 3A, the enclosure 110 may comprise a structure capable of applying at least one of heat 300, pressure 302, and vacuum to a shaped prepreg 104A, a reduced volatile prepreg 106 a prepreg layup 120, or a reduced volatile prepreg layup 122 undergoing volatile reduction, such as ovens and autoclaves. In alternative embodiments, the enclosure 110 may be configured for placement into a device capable of adding heat, vacuum and/or pressure, for example, an oven, autoclave and/or press. For example, in one embodiment, the flow of non-condensing gas 112 may be introduced to the shaped prepreg 104A, reduced volatile prepreg 106 or prepreg layup 120, or reduced volatile layup 122 in an oven to yield a reduced volatile prepreg or reduced volatile layup 106, 122, respectively. Subsequently, the reduced volatile prepreg or reduced volatile layup 106, 122 may be transferred to an autoclave or press for consolidation and cure to form a composite part 124. In another embodiment, a reduced volatile prepreg or reduced volatile prepreg layup 106, 122 respectively may be manufactured in an autoclave or press under pressure.

In embodiments where the shaped prepreg 104A, reduced volatile prepreg 106, prepreg layup 120, or reduced volatile layup 122 are heated during devolatilization, the final temperature may depend on the composition of the shaped prepreg 104A, reduced volatile prepreg 106, prepreg layup 120, or reduced volatile layup 122 and may further comprise a temperature which is approximately equal to the boiling point of at least one solvent within the matrix 100. For example, when reducing volatiles in a shaped prepreg 104A, reduced volatile prepreg 106, prepreg layup 120, or reduced volatile layup 122 containing ethanol, the temperature may equal approximately 190° F. to 230° F. In another embodiment, the temperature may comprise at temperature that is greater than 70%, greater than 75%, greater than 80%, greater than 85%, greater than 90%, or greater than 95% of the boiling point of at least one solvent of the matrix 100.

In certain embodiments, it may be advantageous to heat the shaped prepreg 104A, reduced volatile prepreg 106, prepreg layup 120, or reduced volatile layup 122 slowly during devolatilization, as heating over long times may allow evolving gases time to diffuse out of the shaped prepreg 104A, reduced volatile prepreg 106, prepreg layup 120, or reduced volatile layup 122 and to be removed by the flow of non-condensing gas 112. In certain embodiments, the heating rate may range between about 0.01 to 5° C./min. Advantageously, by selecting the final temperature and/or heating rate with respect to the boiling point of solvents within the matrix 100, boiling or rapid evolution of the solvents and volatiles, resulting in displacement of fibers 102, may be inhibited.

In further embodiments, enclosure 110 may be capable of applying and/or supporting an applied vacuum. For example, enclosure 110 may further comprise a vacuum envelope or vacuum bag 306 well known in the art that forms an approximately gas-tight region in which shaped prepreg 104A, reduced volatile prepreg 106, prepreg layup 120, or reduced volatile layup 122 may be placed. The applied vacuum may be provided by a vacuum source in communication with a gas vent 304 of the enclosure 110. The applied vacuum may further be varied or kept constant while volatile components are removed from the shaped prepreg 104A, reduced volatile prepreg 106, prepreg layup 120, or reduced volatile layup 122. For example, a vacuum of about 1 mm Hg or less may be supported by the vacuum envelope 306. In certain embodiments a vacuum of 350 to 750 mm Hg may be used during the flow of non-condensing gas. In other embodiments the vacuum may be lower.

In further embodiments, enclosure 110 may be capable of applying and/or supporting a pressure 302. The applied pressure 302 may be provided by a pressure source in communication with enclosure 110. The applied pressure 302 may further be varied or kept constant while volatile components are reduced from shaped prepreg 104A, reduced volatile prepreg 106, prepreg layup 120, or reduced volatile layup 122. For example, a pressure ranging about atmospheric pressure up to 4000 psi may be applied.

In other embodiments, enclosure 110 may comprise one or more structures capable of inhibiting flow of the matrix 100 from shaped prepregs 104A, reduced volatile prepreg 106, prepreg layup 120, or reduced volatile layup 122 during volatile reduction and consolidation. For example, dams 314 may be positioned adjacent the sides of shaped prepreg 104A, reduced volatile prepreg 106, prepreg layup 120, or reduced volatile layup 122 so as to inhibit flow of the matrix from the sides of the shaped prepreg 104A, reduced volatile prepreg 106, prepreg layup 120, or reduced volatile layup 122. Alternatively, bleed barriers or separators 322 may be placed adjacent at least one of upper and lower surfaces of the shaped prepreg 104A, reduced volatile prepreg 106, prepreg layup 120, or reduced volatile layup 122 so as to inhibit flow of the matrix from the upper and lower surfaces of the shaped prepreg 104A, reduced volatile prepreg 106, prepreg layup 120, or reduced volatile layup 122.

The flow of non-condensing gas 112 may be injected into enclosure 110 through a gas inlet 310 and removed from the enclosure from a gas vent 304 containing shaped prepreg 104A, reduced volatile prepreg 106, prepreg layup 120, or reduced volatile layup 122. In certain embodiments, the gas vent 304 may be in fluid communication with a vacuum source such that a vacuum may be exerted on shaped prepreg 104A, reduced volatile prepreg 106, prepreg layup 120, or reduced volatile layup 122. In other embodiments, the gas inlet 310 may be positioned such that shaped prepreg 104A, reduced volatile prepreg 106, prepreg layup 120, or reduced volatile layup 122 are interposed between the gas inlet 310 and the vent to vacuum 304, as illustrated in FIG. 3A. This configuration enables a vacuum exerted by the vacuum source to urge the non-condensing gas 112 to follow a path, from about the gas inlet 310 to the gas vent 304, that passes adjacent at least one surface of the shaped prepreg 104A, reduced volatile prepreg 106, prepreg layup 120, or reduced volatile layup 122. In alternative embodiments, the non-condensing gas 112 may be injected and removed from the enclosure 110 at about the same location.

Non-condensing gas 112 may be injected and/or removed from enclosure 110 in a variety of ways. In one embodiment, injection and removal of non-condensing gas 112 from enclosure 110 may be performed concurrently and continuously. In another embodiment, injection and removal of non-condensing gas 112 from enclosure 110 may be performed sequentially, or stepwise. For example, non-condensing gas 112 may be first introduced into enclosure 110 and, subsequently, enclosure 112 may be vented to remove the non-condensing gas from enclosure 110.

In other embodiments, enclosure 110 may comprise one or more structures that enable flow of non-condensing gas 112 adjacent shaped prepreg 104A, reduced volatile prepreg 106, prepreg layup 120, or reduced volatile layup 122. For example, molds 116, 116A may possess a plurality of purge holes 312, as illustrated in FIG. 3A. The purge holes 312 may comprise conduits through the molds 116, 116A that allow the transport of gases, such as evolved gases 114 and the non-condensing gas 112, through the molds 116, 116A. Purge holes 312 may be further oriented approximately perpendicular to, and/or approximately parallel to, the plane of shaped prepreg 104A, reduced volatile prepreg 106, prepreg layup 120, or reduced volatile layup 122. Beneficially then, even when one or more of molds 116, 116A contact the outer surfaces of the shaped prepreg 104A, reduced volatile prepreg 106, prepreg layup 120, or reduced volatile layup 122, the plurality of purge holes 312 allow the non-condensing gas 112 and the evolved gases 114 to move adjacent the outer surfaces of the shaped prepreg 104A, reduced volatile prepreg 106, prepreg layup 120, or reduced volatile layup 122, facilitating removal of the volatile components from shaped prepreg 104A, reduced volatile prepreg 106, prepreg layup 120, or reduced volatile layup 122. In other embodiments illustrated in FIG. 3A, an optional breather 330 may be placed between the bleed barrier or separator 322 and the vacuum envelope 306. The flow of non-condensing gas may be through this breather. The breather may be fiberglass, polyester, polyester pile and the like.

In other embodiments, illustrated in FIG. 3B, vacuum envelope 306 may be omitted from enclosure 110. Under these circumstances, the flow of non-condensing gas 112 may enter and exit enclosure 110 through a gas inlet 310A and gas vent 310B within the walls of enclosure 110. Similar to the gas inlet 310 and the vent to vacuum 304 illustrated in FIG. 3A, the gas inlet 310A and gas vent 310B may be positioned such that shaped prepreg 104A, reduced volatile prepreg 106, prepreg layup 120, or reduced volatile layup 122 are interposed between gas inlet 310A and gas vent 310B. By maintaining the gas vent 310B at a pressure less than that of gas inlet 310A, the pressure gradient between gas inlet 310A and gas vent 310B may urge the non-condensing gas 112 to follow a path that runs adjacent at least one surface of shaped prepreg 104A, reduced volatile prepreg 106, prepreg layup 120, or reduced volatile layup 122, transporting evolved gases 114 away from shaped prepreg 104A, reduced volatile prepreg 106, prepreg layup 120, or reduced volatile layup 122 and increasing the rate and/or the completeness of removal of volatile components from shaped prepreg 104A, reduced volatile prepreg 106, prepreg layup 120, or reduced volatile layup 122. In alternative embodiments, the gas inlet 310A and gas vent 310B may be combined and the operations of injecting the non-condensing gas into and removing the non-condensing gas 112 from within the enclosure 110 may be performed sequentially.

In one embodiment, shaped prepreg 104A, reduced volatile prepreg 106, prepreg layup 120, or reduced volatile layup 122 may be further molded without a cavity. For example, shaped prepreg 104A, reduced volatile prepreg 106, prepreg layup 120, or reduced volatile layup 122 may be covered with a permeable mold separator or bleed barrier 322, where there is approximately no resistance to evolved gases 114 escaping the surface of shaped prepreg 104A, reduced volatile prepreg 106, prepreg layup 120, or reduced volatile layup 122. This configuration may further employ weights, springs, tensioning belts, or other mechanisms if shaped prepreg 104A, reduced volatile prepreg 106, prepreg layup 120, or reduced volatile layup 122 possess curvature. Shaped prepreg 104A, reduced volatile prepreg 106, prepreg layup 120, or reduced volatile layup 122 may then be placed in an oven and heated. The gases and volatiles are readily removed by the rapid diffusion away from shaped prepreg 104A, reduced volatile prepreg 106, prepreg layup 120, or reduced volatile layup 122. The devolatilized prepregs and devolatilized layups 106, 122 may then be transferred to a press, vacuum enclosure or envelope or autoclave for consolidation and/or curing to form the composite part. Such an embodiment may be advantageous in circumstances where shaped prepregs 104A, reduced volatile prepreg 106, prepreg layup 120, or reduced volatile layup 122 are added to prepreg layups 120, 122 during volatile reduction in multiple stages.

In additional embodiments, FIG. 3C, shaped prepreg 104A, reduced volatile prepreg 106, prepreg layup 120, or reduced volatile layup 122 may be further combined with a plurality of cores 320 formed of foam, honeycomb, or other materials. The cores 320 may be positioned adjacent the prepregs 104A, 106 before or during removal of volatile components from the shaped prepreg 104A, reduced volatile prepreg 106, prepreg layup 120, or reduced volatile layup 122. For example, the cores 320 may be positioned adjacent to one side of one or more shaped prepregs 104A, reduced volatile prepreg 106, prepreg layup 120, or reduced volatile layup 122. Alternatively, the cores 320 may be positioned between adjacent prepregs 104, 106.

Volatile components may be removed from shaped prepreg 104A, reduced volatile prepreg 106, prepreg layup 120, or reduced volatile layup 122 with cores 320 in a manner similar to that discussed above. In certain embodiments, shaped prepreg 104A, reduced volatile prepreg 106, prepreg layup 120, or reduced volatile layup 122, molds 116, and cores 320 may be placed within a vacuum envelope 306. In alternative embodiments, the vacuum envelope 306 may be omitted. The flow of non-condensing gas 112 is injected within the enclosure 110 and flows adjacent the surfaces of the molds 116, cores 320, shaped prepreg 104A, reduced volatile prepreg 106, prepreg layup 120, or reduced volatile layup 122, and combinations thereof. Volatile components within shaped prepreg 104A, reduced volatile prepreg 106, prepreg layup 120, or reduced volatile layup 122 may evolve gases 114 spontaneously or upon exposure to heat 300, pressure 302, and/or vacuum, and travel through shaped prepreg 104A, reduced volatile prepreg 106, prepreg layup 120, or reduced volatile layup 122, molds 116, and/or cores 320. When the evolved gases 114 encounter the flow of non-condensing gas 112, at least a portion of the evolved gases 114 are transported away from shaped prepreg 104A, reduced volatile prepreg 106, prepreg layup 120, or reduced volatile layup 122, with the flow of non-condensing gas 112.

Molds 116 and cores 320 may further assist in the reducing the of volatile components in the shaped prepreg 104A, reduced volatile prepreg 106, prepreg layup 120, or reduced volatile layup 122 and containment of the matrix 100. For example, in one embodiment, the molds 116 and cores 320 may function in a manner similar to the bleed barrier or seperator or 322. In other embodiments, the molds 116 and cores 320 may function similarly to a breather layer, maintaining a path throughout the vacuum envelope 306 to the vacuum source. This path enables the non-condensing gas 112 and evolved gases 114 to be removed from the vacuum envelope 306 without being slowed by obstacles that might be otherwise present absent the path. The path further enables an approximately continuous vacuum and/or pressure 302 to be applied to the shaped prepreg 104A, reduced volatile prepreg 106, prepreg layup 120, or reduced volatile layup 122.

It may be understood that the process of reducing volatile component shaped prepreg 104A, reduced volatile prepreg 106, prepreg layup 120, or reduced volatile layup 122 may be interrupted and/or restarted at any time. In one embodiment, one or more of the shaped prepregs 104A, reduced volatile prepreg 106, prepreg layup 120, or reduced volatile layup 122 may be placed within the enclosure 110 for volatile component removal using the flow of non-condensing gas 112, as discussed above and the volatile removal process may be interrupted prior to the removal of a desired amount of volatile components from shaped prepreg 104A, reduced volatile prepreg 106, prepreg layup 120, or reduced volatile layup 122. In other embodiments, additional prepregs 104A, reduced volatile prepreg 106, prepreg layup 120, or reduced volatile layup 122 may be added to those already present within the enclosure and the devolatilization process may be restarted.

As illustrated in FIG. 1E further embodiments, reduced volatile prepregs 106 or reduced volatile prepreg layups 122 may be employed to form the composite part 124. The consolidation process may employ at least one of heat, pressure, and vacuum in order to urge the matrix 100 to flow into at least a portion of the void space that is located within and between reduced volatile prepreg 106 or the reduced volatile layup 122. In embodiments where enclosure 110 comprises an autoclave, reduced volatile prepreg 106 or reduced volatile prepreg layup 122 may be subjected to heat 300, vacuum, and/or pressure 302 to consolidate the reduced volatile prepreg 106 or reduced volatile prepreg layup 122 into the composite part 124, and cure the matrix 102. In embodiments where the enclosure 110 comprises an oven, the reduced volatile prepreg 106 or reduced volatile prepreg layup 122 may be subjected to heat, without pressure, to consolidate the reduced volatile prepreg 106 or reduced volatile prepreg layup 122 into the composite part 124 and cure the matrix 102. In embodiments where the enclosure comprises a vacuum envelope 306, the reduced volatile prepreg layup 122 may be subjected to vacuum and/or heat to consolidate the reduced volatile prepreg 106 or reduced volatile prepreg layup 122 into the composite part 124. In embodiments where enclosure 110 comprises molds 116, 116A, reduced volatile prepreg 106 or reduced volatile prepreg layup 122 may be further molded and/or compression molded using the molds 116, 116A to consolidate reduced volatile prepreg 105 or reduced volatile prepreg layup 122 into composite part 124.

Upon completion of consolidation and curing of reduced volatile prepreg 106 or prepreg layup 122, composite part 124 formed may possess a porosity ranging between about 0 to 30 vol. % on the basis of the total volume of the composite.

In other embodiments, the volatile reducing processes discussed herein may be further employed to facilitate adhesive bonding. Adhesives, such as polyimide resin adhesives, may comprise alcohols and higher boiling solvents, for example, NMP. Adhesives may further comprise a carrier, for example, fiberglass, or Astroquartz®. Adhesives may be placed between cured or uncured components, for example, composite parts 124, and/or honeycomb or foam core to form an assembly. The assembly enclosed may have the capability of adding at least one of vacuum pressure or heat. By exposing the component/adhesive system to a flow of non-condensing gas adjacent the interface between the components, or through the assembly enclosed with subsequent consolidation and cure as described herein, may reduce the interface porosity.

EXAMPLES

The following examples are provided to demonstrate the benefits of the embodiments of the disclosed devolatilized prepregs, devolatilized layups, and composites formed therefrom. For example, as discussed below, the examples show that a flow of a non-condensing gas enables the removal of gases from prepreg layups more efficiently and yields lower bleed and resin loss and/or reduced porosity composites upon consolidation and curing. These examples are discussed for illustrative purposes and should not be construed to limit the scope of the disclosed embodiments.

Example 1

Carbon Fiber/Polyimide Composites Fabricated with and without Non-Condensing Gas Flow Three carbon fiber/epoxy composites Trial 1, Trial 2, and Trial 3, were fabricated from shaped prepreg layups in an enclosure depicted in FIG. 3A using the optional breather. The shaped prepreg layups of Trial 2 and Trial 3 were subjected to a flow of non-condensing gas, in combination with heat and vacuum pressure, to facilitate removal of volatile components from the shaped prepreg layups. For comparison, the shaped prepreg layup of Trial 1 was not subjected to the flow of non-condensing gas. Subsequently, the reduced volatile layups were cured using a combination of heat, vacuum, and pressure. It was observed that parts formed with devolatilized prepregs in Trial 2 and Trial 3, exhibited substantially no bleed or resin loss, while parts formed without the flow of non-condensing gas, Trial 1, exhibited about 5 wt. % resin loss.

TABLE 1

Test Parameters and results of Example 1

| Trial | Experiment | Resin System | Non-condensing gas flow? | Bleed (wt. %) |
|---|---|---|---|---|
| 1 | 6" × 6" laminate | Polyimide | No | 5.0% |
| 2 | 6" × 6" laminate | Polyimide | Yes | 0% |
| 3 | 6" × 6" laminate | Polyimide | Yes, until end of 210° F. hold | 0% |

Trial 1—Carbon Fiber/Epoxy Composite Fabricated without Non-Condensing Gas Flow

The composite part of Trial 1 was fabricated from prepregs comprising T650-35 6K 5HS carbon fiber fabric. The matrix resin, comprising a polyimide resin mixture which contained about 20% ethanol solvent and a resin solid content of about 80% was impregnated into the fabric such that the matrix weight fraction of the prepregs was approximately 60 wt. %. The prepregs were cut into sheets of approximately 6" by 6" and eight prepregs were stacked to form a 0/90 prepreg layup. The prepreg layup was surrounded by a dam and overlaid with two plies of TX-1080 Teflon separator and polyester fiber breather and was connected to a vacuum source.

Heat and vacuum were further applied to the assembly for volatile reduction. The applied vacuum level was about 735 mm Hg absolute and the assembly was heated at about 5° F./minute to about 190° F. Subsequently, the assembly was further heated at about 0.1° F./minute to about 210° F. and cooled to room temperature.

In order to form the composite, the dam was removed and the polyester breather was replaced by 3 plies of 7781 style fiberglass. The assembly containing the reduced volatile layup was then cured as follows:

(1) application of about 25 mm of vacuum;
(2) the assembly was heated from about room temperature to about 480° F. at about 3° F./minute and held there for about 2 hours
(3) the assembly was heated from about 480° F. to about 575° F. at about 2° F./minute and held there for about 2 hours
(4) about 200 psi autoclave pressure was added at about 20 psi per minute;
(5) the assembly was heated from about 575° F. to about 700° F. at about 1° F./minute and held there for about 3 hours.
(6) the assembly was cooled to about room temperature.

The composite part formed in Trial 1 was then examined to measure the resin bleed and porosity of the composite. It was determined that the composite porosity was about 0% and approximately 5% resin bleed had taken place during manufacture.

Trial 2—Carbon Fiber/Epoxy Composite Fabricated with Non-Condensing Gas Flow

The composite part of Trial 2 was manufactured in a similar manner as Trial 1, with the exception that a stream of air at about 300 mL/min was passed through the vacuum envelope during the volatile reduction operation. Examination of the composite formed in Trial 2 found the composite to have approximately 0% porosity and approximately no resin bleed had taken place during manufacture.

Trial 3—Carbon Fiber/Epoxy Composite Fabricated with Non-Condensing Gas Flow and without Polyester Breather The composite part of Trial 3 was manufactured in a similar manner as Trial 2, except that the vacuum envelope comprised a non-polyester, 7781 fiberglass breather. The composite part, in addition to the 7781 breather, was heated from room temperature to about 190° F. at about 5° F./min, and then to about 210° F. at about 0.1° F./minute. During the volatile reduction operation, the flow of air was maintained at about 300 mL/min. until the end of the period during which the temperature was held at about 210° F. Subsequently, the cure cycle of Trial 1 was applied, without removing the devolatilized layup from the vacuum envelope, and without replacing the vacuum envelope containing the 7781 breather. Examination of the composite formed in Trial 2 found the composite to have approximately 0% porosity and approximately no resin bleed had taken place during manufacture.

Example 2

Carbon Fiber/Polyimide Half-Cylinder Fabrication with and without Non-Condensing Gas Flow Two carbon fiber/epoxy composites, Tests 4 and 5, were fabricated under the same layup assembly and cure conditions as discussed above in Example 1. However, tests 4 and 5 were performed with a larger number of prepreg layers in the prepreg layup, larger sized prepreg layers, and the layup and consolidation were performed upon a large, complex mold. It was observed that parts formed with the flow of non condensing gas, in Trial 5, exhibited substantially no bleed or resin loss, while parts formed without the flow of non-condensing gas, Trial 4, exhibited about 16 wt. % resin loss.

TABLE 2

Test Parameters and results of Example 2

| Trial | Experiment | Resin System | Non-condensing gas flow? | Bleed (wt. %) |
|---|---|---|---|---|
| 4 | Large curved part | Polyimide | No | 16% |
| 5 | Large curved part | Polyimide | Yes | 0% |

Trial 4—Carbon Fiber/Epoxy Composite Fabricated without Non-Condensing Gas Flow on Complex Molding The composite part of Trial 4 was manufactured in a manner similar to Trial 1, except with a larger ply size and greater quantity, and on a larger, more complicated mold. For this trial, fifteen prepreg layers were cut to approximately 2'×2', laid up upon a semi-circular cylinder, 16 inches in diameter and volatiles were reduced. During this volatile reduction process, a vacuum of about 125 mm Hg was applied. Examination of the prepreg layup formed in Trial 4 after volatile reduction found that the layup had bled excessively, losing approximately 16% of its matrix resin, by weight.

Trial 5—Carbon Fiber/Epoxy Composite Fabricated with Non-Condensing Gas Flow on Complex Molding The composite part of Trial 5 was manufactured in a manner similar to Trial 4, Trial 2 with the exceptions noted in and with different ply size and quantity, and on a larger, more complicated mold. For this trial, fifteen layers of prepreg were cut to approximately 2'×2', laid up upon a semi-circular cylinder with downs and the volatiles reduced using a gas flow about 5 liters/min. The dam material was removed and the part was consolidated and cured as described in Trial 1/. Examination of the composite formed in Trial 5 found the composite to have approximately 0% porosity and approximately no resin bleed had taken place during manufacture.

Example 3

Carbon Fiber/Polyimide Composites Containing Ethanol and NMP (Avimid RB) Fabricated with and without Non-Condensing Gas Flow Example 3 demonstrates the use of an air stream on a multi-solvent system to reduce resin bleed. Two carbon fiber/epoxy composites, Trials 6 and 7, were fabricated under the assembly and cure conditions as in Trial 1 and Trial 2 in Example 1, employing Avimid RB polyimide prepreg, T650-35 6K 5HS. Avimid RB prepreg comprises about 8% ethanol by weight and about 8% NMP by weight, with a matrix weight fraction of about 60%. It was observed that parts formed with the flow of non condensing gas in Trial 6, exhibited relatively low bleed, about 1.9 wt. %, while parts formed without the flow of non-condensing gas, Trial 7, exhibited about 12.6 wt. % resin loss.

TABLE 3

Test Parameters and results of Example 3

| Trial | Experiment | Resin System | Non-condensing gas flow? | Bleed (wt. %) |
|---|---|---|---|---|
| 6 | 6" × 6" laminate | Avimid RB | Yes | 1.9% |
| 7 | 6" × 6" laminate | Avimid RB | No | 12.6% |

Trial 6—Avimid RB Polyimide Prepreg Fabricated with Non-Condensing Gas Flow

Trial 6 evaluated bleed using Avimid RB polyimide prepreg T650-35 6K 5HS. The prepreg layup assembly was done in a manner similar to that of Trial 1. An air stream at about 300 ml/min was passed through the vacuum envelope during the volatile reduction operation. Initially, heat was added at about 0.5° F./minute from about 190° F. to about 210° F. Heat was then added at about 1° F./minute to about 500° F. to drive off the NMP. Examination of the composite formed in trial 6 found that about 1.9 wt. % of resin had bled during manufacture.

Trial 7—Avimid RB Polyimide Prepreg Fabricated without Non-Condensing Gas Flow

Trial 7 was performed similarly to Test 6, except without the use of an air stream. Examination of the composite formed in Trial 7 found that about 12.6 wt. % of resin had bled during manufacture.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of forming shaped prepregs with reduced volatile components, comprising:
   providing at least one curable prepreg comprising fiber-reinforced matrix resin and one or more volatile components embedded therein, said prepreg having a first geometric configuration;
   deforming said at least one prepreg from the first geometric configuration to a second geometric configuration by a shaping device to form at least one shaped prepreg such that a surface of the prepreg is exposed;
   surrounding said at least one shaped prepreg with an enclosure while said at least one prepreg layup is being deformed by the shaping device;
   introducing a flow of a non-condensing gas into the enclosure adjacent to the at least one shaped prepreg in the enclosure and simultaneously removing at least a portion of the non-condensing gas from the enclosure such that the non-condensing gas transports the one or more volatile components away from the exposed surface of the at least one shaped prepreg, thereby resulting in at least one curable shaped prepreg with reduced volatiles;
   applying vacuum and heat to the at least one curable shaped prepreg during the introduction of the flow of non-condensing gas to facilitate the evolution of one or more volatile components from the at least one shaped prepreg,
   wherein the introduction and removal of the non-condensing gas, and the application of vacuum and heat are carried out prior to curing the at least one shaped prepreg with reduced volatiles.

2. The method of claim 1, wherein the flow of the non-condensing gas is introduced until the matrix resin of the shaped prepreg is higher in viscosity.

3. The method of claim 1, wherein the non-condensing gas comprises air, nitrogen, oxygen, neon, argon, methane, ethane, ethylene, propane, hydrogen, or helium, and combinations thereof.

4. The method of claim 1, wherein the flow of the non-condensing gas is at a rate ranging between about 0.001 to 1000 ml/sec.

5. The method of claim 1, wherein the enclosure is an autoclave or an oven.

6. The method of claim 1, wherein the matrix resin of the prepreg comprises one or more resins selected from epoxies, phenolics, imides, polyimides, esters, polyesters, and benzoxazines.

7. The method of claim 6, wherein the matrix resin further comprises an ethynyl, nadic maleimide, allylnadic, or olefinic endcap group.

8. The method of claim 1, wherein less than 10 wt. % of the matrix resin bleeds during forming of the reduced volatiles prepreg, on the basis of the total weight of the at least one shaped prepreg prior to forming.

9. The method of claim 1, further comprising consolidating and curing the resulting at least one shaped prepreg with reduced volatiles to produce a shaped composite, wherein curing results in crosslinking of the matrix resin.

10. The method of claim 1, further comprising curing the resulting prepreg with reduced volatiles, wherein curing results in crosslinking of the matrix resin.

11. The method of claim 1,
wherein the one or more volatile components comprises at least one solvent, and heat is applied to the at least one shaped prepreg to evolve one or more volatile components from the at least one shaped prepreg, said heating comprising increasing the temperature of the at least one shaped prepreg from a first temperature to a second temperature that is about a boiling point of the at least one solvent contained within the shaped prepreg.

12. The method of claim 1, wherein the shaping device comprises two opposing mold parts, and the shaped prepreg is positioned between and constrained by the mold parts, and wherein the flow of non-condensing gas passes between the mold parts.

13. The method of claim 1, wherein at least a portion of the shaping device comprises a curvature and at least a portion of the shaped prepreg conforms to said curvature.

14. The method of claim 1, wherein said at least one prepreg is a plurality of prepregs placed adjacent to one another to form a prepreg layup.

15. A method of forming shaped prepregs with reduced volatile components, comprising:
providing at least one curable prepreg comprising fiber-reinforced matrix resin and one or more volatile components, said prepreg having a first geometric configuration;
deforming the prepreg from the first geometric configuration to a second geometric configuration to form a shaped prepreg by placing the prepreg in contact with a mold and constraining the prepreg on the mold such that a surface of the prepreg is exposed;
enclosing the shaped prepreg with a vacuum bag while the shaped prepreg is in contact with the mold, said vacuum bag being in communication with a vacuum source;
placing a breather between the vacuum bag and the exposed surface of the shaped prepreg, said breather being configured to allow non-condensing gas to flow through;
introducing a flow of non-condensing gas into the vacuum bag while applying vacuum such that the flow of non-condensing gas passes through the breather and transports the one or more volatilized components away from the exposed surface of the shaped prepreg, thereby resulting in curable shaped prepreg with reduced volatiles; and
applying heat to the shaped prepreg to facilitate the removal of one or more volatile components from the shaped prepreg,
wherein the introduction of the non-condensing gas, the application of vacuum and heat are carried out prior to curing the shaped prepreg.

16. The method of claim 15 further comprising consolidating and curing the curable shaped prepreg with reduced volatiles, wherein curing results in crosslinking of the matrix resin.

17. The method of claim 15, wherein at least a portion of the mold comprises a curvature and at least a portion of the shaped prepreg conforms to said curvature.

18. The method of claim 15, wherein said at least one prepreg is a plurality of prepregs placed adjacent to one another to form a prepreg layup.

19. A method of forming a shaped composite part with reduced volatile components, comprising:
providing a prepreg layup comprising a plurality of prepregs, each prepreg comprising a fiber-reinforced matrix resin and one or more volatile solvents embedded therein;
shaping the prepreg layup by placing the prepreg layup in contact with a mold having a geometric configuration such that at least a portion of the prepreg layup conforms to the geometric configuration of the mold and a surface of the prepreg layup is exposed;
enclosing the shaped prepreg with a vacuum bag while the shaped prepreg is in contact with the mold, said vacuum bag being in communication with a vacuum source;
placing a breather between the vacuum bag and the shaped prepreg, said breather being configured to allow non-condensing gas to flow through;
applying heat to the shaped prepreg to volatize the one or more volatile solvents from the prepreg;
introducing a flow of non-condensing gas into the vacuum bag while applying vacuum such that the flow of non-condensing gas passes through the breather and transports the one or more volatilized solvents away from the exposed surface of the shaped prepreg layup, thereby resulting in a curable shaped prepreg with reduced volatiles;
consolidating and curing the resulting shaped prepreg layup with reduced volatiles to form a shaped composite part having a porosity of less than 30 vol. % based on the total volume of the composite part, wherein curing results in crosslinking of the matrix resin.

* * * * *